(12) United States Patent
Liegard et al.

(10) Patent No.: US 10,884,908 B2
(45) Date of Patent: Jan. 5, 2021

(54) WEB-BASED APPLICATION PLATFORM APPLYING LEAN PRODUCTION METHODS TO SYSTEM DELIVERY TESTING

(71) Applicant: Accenture Global Solutions Limited, Dublin (IE)

(72) Inventors: Michel-Etienne Liegard, Le Kremlin Bicêtre (FR); Antoine Sebilleau, Neuilly sur Seine (FR)

(73) Assignee: Accenture Global Solutions Limited, Dublin (IE)

( * ) Notice: Subject to any disclaimer, the term of this patent is extended or adjusted under 35 U.S.C. 154(b) by 106 days.

(21) Appl. No.: 16/153,933

(22) Filed: Oct. 8, 2018

(65) Prior Publication Data

US 2020/0110696 A1 Apr. 9, 2020

(51) Int. Cl.
  *G06F 11/00* (2006.01)
  *G06F 11/36* (2006.01)
  *G06F 9/54* (2006.01)

(52) U.S. Cl.
  CPC ............ *G06F 11/3688* (2013.01); *G06F 9/54* (2013.01); *G06F 11/368* (2013.01)

(58) Field of Classification Search
  CPC .......................... G06F 11/368; G06F 11/3688
  See application file for complete search history.

(56) References Cited

U.S. PATENT DOCUMENTS

| 5,951,697 A | 9/1999 | O'Donnell et al. |
| 8,185,877 B1 | 5/2012 | Colcord |
| 10,241,898 B2 * | 3/2019 | Agrawal ................. G06F 11/36 |
| 10,296,448 B2 * | 5/2019 | Bender ............... G06F 11/3692 |
| 2004/0107125 A1 * | 6/2004 | Guheen .................. G06Q 99/00 |
| | | 705/319 |
| 2005/0172268 A1 | 8/2005 | Kuturianu |

(Continued)

FOREIGN PATENT DOCUMENTS

| JP | 2011-128940 | 6/2011 |
| JP | 2013-069077 | 4/2013 |
| JP | 2018-055189 | 4/2018 |

OTHER PUBLICATIONS

EP Search Report in European Application No. EP19195003, dated Mar. 16, 2020, 10 pages.

(Continued)

*Primary Examiner* — Elmira Mehramanesh
(74) *Attorney, Agent, or Firm* — Fish & Richardson P.C.

(57) ABSTRACT

Implementations include receiving, by a DDT platform, computer-readable files including test data, the test data including data to execute at least one transaction during testing of a software system that is at least partially hosted by a vendor back-end system, the software system being configured for customer use, providing, by the DDT platform, one or more test scenarios for execution by the software system on the vendor back-end system, the one or more test scenarios including a set of activities to conduct transactions by the software system using at least a portion of the test data, scheduling, by a scheduler of the DDT platform, execution of the one or more test scenarios using a test harness of the DDT platform, receiving, by the DDT platform, test results from the vendor back-end system, and comparing, by the DDT platform, the test results to expected results to provide a comparison as output.

24 Claims, 4 Drawing Sheets

(56) References Cited

U.S. PATENT DOCUMENTS

| | | | | |
|---|---|---|---|---|
| 2005/0193269 A1* | 9/2005 | Haswell | ............ | G06F 11/3684 |
| | | | | 714/38.13 |
| 2008/0282231 A1* | 11/2008 | R | ..................... | G06F 11/3684 |
| | | | | 717/127 |
| 2009/0307763 A1* | 12/2009 | Rawlins | ............ | G06F 11/3672 |
| | | | | 726/5 |
| 2010/0057693 A1* | 3/2010 | Himstedt | ........... | G06F 11/3672 |
| | | | | 707/E17.005 |
| 2011/0302451 A1* | 12/2011 | Smith | ............... | G06F 11/3672 |
| | | | | 714/32 |
| 2013/0152047 A1* | 6/2013 | Moorthi | ............. | G06F 11/368 |
| | | | | 717/124 |
| 2013/0297973 A1 | 11/2013 | Hyland et al. | | |
| 2015/0356001 A1* | 12/2015 | Murugesan | ........ | G06F 11/3684 |
| | | | | 717/124 |
| 2015/0363304 A1* | 12/2015 | Nagamalla | ......... | G06F 11/3648 |
| | | | | 702/123 |
| 2017/0220458 A1* | 8/2017 | Finger | ................. | G06F 11/368 |
| 2018/0018680 A1* | 1/2018 | Bs | .................... | G06F 11/3664 |

OTHER PUBLICATIONS

EP Office Action in European Application No. 19195003.9, dated Sep. 3, 2020, 10 pages.

JP Office Action in Japanese Application No. 2019-184416, dated Nov. 10, 2020, 10 pages (with English translation).

* cited by examiner

WEB-BASED APPLICATION PLATFORM APPLYING LEAN PRODUCTION METHODS TO SYSTEM DELIVERY TESTING

BACKGROUND

Enterprises can provide software systems that are designed, tested, and deployed to customers. Such processes can be collectively referred to as delivery (e.g., delivery of a software system to a customer landscape). Delivery of software systems, testing in particular, is time and resource intensive. Although third-party vendors provide computer-implemented tools, a complete solution suite at scale to manage test artefacts, and data is lacking. For example, traditional tools are, by nature, either very generic to cover the test lifecycle, or very specific to cover specific phase of test delivery (e.g., automation). As a result, the coverage of different test activities (e.g., test design, test data management, test artefact creation and execution, KPI reporting) requires different tools that are not systematically deployed on software delivery projects (e.g., by customers), or not deployed as standard assets. In short, there is no appropriate tool, or suite of tools that enable straight integration, and/or accelerate delivery of software systems.

SUMMARY

Implementations of the present disclosure are generally directed to system delivery testing. More particularly, implementations of the present disclosure are directed to a web-based application for applying lean production methods to system delivery testing, and including computer aided test design, and execution tool for building and executing test artefacts.

In some implementations, actions include receiving, by a data drive test (DDT) platform, one or more computer-readable files including test data, the test data including data to execute at least one transaction during testing of a software system that is at least partially hosted by a vendor back-end system, the software system being configured for customer use, providing, by the DDT platform, one or more test scenarios for execution by the software system on the vendor back-end system, the one or more test scenarios including a set of activities to conduct transactions by the software system using at least a portion of the test data, scheduling, by a scheduler of the DDT platform, execution of the one or more test scenarios using a test harness of the DDT platform, receiving, by the DDT platform, test results from the vendor back-end system, and comparing, by the DDT platform, the test results to expected results to provide a comparison as output. Other implementations of this aspect include corresponding systems, apparatus, and computer programs, configured to perform the actions of the methods, encoded on computer storage devices.

These and other implementations can each optionally include one or more of the following features: execution of the one or more test scenarios at least partially includes, by the test harness: converting at least a portion of the test data from a first format to a second format, and transmitting at least a portion of converted test data to the software system through one or more application programming interfaces (APIs); the one or more APIs are exposed by the vendor back-end system; the test harness receives the test results, and compares the test results to the expected results, and provides the comparison; the one or more test scenarios are provided based on user input to a test design application of the DDT platform; at least one test scenario is partially based on reuse of a test asset stored in a central repository of the DDT platform; execution of the one or more test scenarios affects one or more data objects stored within a database of the vendor back-end system; and at least a portion of the test results includes changes to the one or more data objects, and at least a portion of the expected test results includes expected changes to the one or more data objects.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed to system delivery testing. More particularly, implementations of the present disclosure are directed to a web-based, data delivery testing (DDT) platform for applying lean production methods to system delivery testing. In some implementations, the DDT platform includes computer aided test design, and execution tools for building and executing test artefacts. In some implementations, actions include receiving, by a data drive test (DDT) platform, one or more computer-readable files including test data, the test data including data to execute at least one transaction during testing of a software system that is at least partially hosted by a vendor back-end system, the software system being configured for customer use, providing, by the DDT platform, one or more test scenarios for execution by the software system on the vendor back-end system, the one or more test scenarios including a set of activities to conduct transactions by the software system using at least a portion of the test data, scheduling, by a scheduler of the DDT platform, execution of the one or more test scenarios using a test harness of the DDT platform, receiving, by the DDT platform, test results from the vendor back-end system, and comparing, by the DDT platform, the test results to expected results to provide a comparison as output.

Figure 1:
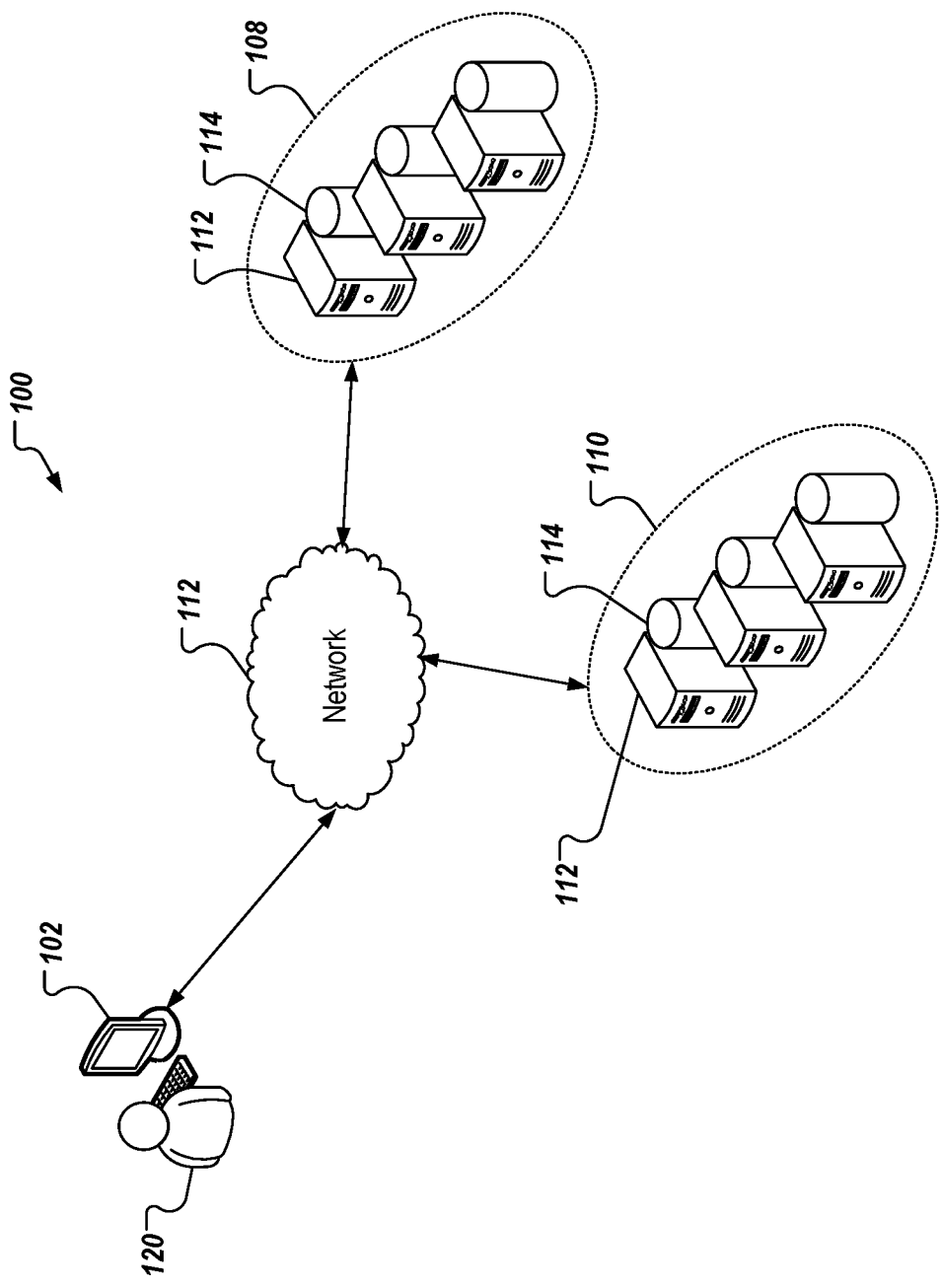
FIG. 1 depicts an example system that can execute implementations of the present disclosure.

FIG. 1 depicts an example system 100 that can execute implementations of the present disclosure. The example system 100 includes a computing device 102, a back-end system 108, and a network 110. In some examples, the network 110 includes a local area network (LAN), wide area network (WAN), the Internet, or a combination thereof, and connects web sites, devices (e.g., the computing device 102), and back-end systems (e.g., the back-end system 108). In some examples, the network 110 can be accessed over a wired and/or a wireless communications link. For example, mobile computing devices, such as smartphones can utilize a cellular network to access the network 110.

In the depicted example, the back-end system 108 includes at least one server system 112, and data store 114 (e.g., database and knowledge graph structure). In some examples, the at least one server system 112 hosts one or more computer-implemented services that users can interact with using computing devices. For example, the server system 112 can host a DDT platform for system delivery testing in accordance with implementations of the present disclosure.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the back-end system 108 hosts the DDT platform for system delivery testing in accordance with implementations of the present disclosure. As described in further detail herein, the DDT platform of the present disclosure enables a user 120 (e.g., or multiple users) to define scenarios for testing configurations of software systems for customers. For example, a software system can be provided by an enterprise, and can include components to be integrated on a client-side (e.g., at a customer), and components executed on a back-end system 110. For example, the back-end system 110 can be operated by the enterprise, and can host components of the software system that can be accessed through one or more application programming interfaces (APIs). An example enterprise providing software systems includes, without limitation, SAP SE of Walldorf, Germany. An example software system can include, without limitation, an enterprise resource planning (ERP) system. It is contemplated, however, that implementations of the present disclosure can be realized using any appropriate software system of any enterprise.

In general, and as described in further detail herein, the DDT platform of the present disclosure supports test delivery and customization of software systems. For example, the DDT platform supports system testing including integration of all transactions, and processes. In some examples, the DDT platform supports full integration tests, and communication with legacy systems of customers. The DDT platform of the present disclosure executes test scenarios that directly impact data objects within a database to observe whether the integration executes properly (e.g., were the data objects properly updated within the database). That is, and as compared to traditional tools, the DDT platform of the present disclosure provides a broader scope of testing.

The impact of changes to data objects can occur across hundreds of tables, and across modules, which can be observed using the DDT platform of the present disclosure.

In general, and as described in further detail herein, the DDT platform enables users (e.g., consultants integrating software systems of an enterprise at a customer) to build data-based test cases, that are executed on back-end systems (e.g., of the enterprise providing the integrated software system, through one or more APIs. In some examples, a scenario includes multiple test elements (e.g., activities) that are executed through APIs. In some examples, an activity includes a set of transactions that are to be executed on data objects within a database. As described in further detail herein, the test scenarios are pushed to a scheduler of the DDT platform, which executes activities (e.g., overnight). As also described in further detail herein, a harness of the DDT platform takes data from test files, converts the data to an appropriate format (e.g., JSON), sends the data and to the software system under test through an API, receives results of the test, and provides a comparison (e.g., actual results versus expected results). In some examples, the results include a comparison of data objects (e.g., field-to-field, table-to-table) to identify any unexpected variation.

To provide context for implementations of the present disclosure, and as introduced above, enterprises can provide software systems to customers. A software system can be provided to a customer in a delivery process. An example delivery process can include, without limitation, planning, designing, building, testing, and deployment phases. Traditional software system delivery can be performed using one or more delivery tools. Example delivery tools can include application design, modeling, and development tools (e.g., IBM Rational Software Suite), application lifecycle management (ALM) tools (e.g., Microfocus ALM Suite), and test management tools (e.g., JIRA with XRAY). Other example tools can include, without limitation, test scripting tools (e.g., Microfocus UFT, Worksoft Certify, Tosca Tricentris).

For test data management, third-party vendors provide tools for software systems. However, no vendor provides a complete solution suite at scale to manage test artefacts, and data. These traditional tools are, by nature, either very generic to cover the test lifecycle, or very specific to cover specific phase of test delivery (e.g., automation). As a result, the coverage of different test activities (e.g., test design, test data management, test artefact creation and execution, KPI reporting) requires different tools that are not systematically deployed on software delivery projects (e.g., by customers), or not deployed as standard assets. The landscape of traditional testing suites, and testing stack usage coverage, reveals that there is no appropriate tool, or suite of tools that enable straight integration, and/or accelerate delivery of software systems.

A test method can be provided for software systems. In some examples, test preparation is initiated in the build phase, and can include providing documentation of case of usage of the software system. This test preparation can be collected/managed through, and ALM tool, and/or other applications (e.g., Microsoft Excel). In some examples, a user (e.g., consultant) provides literal descriptions (test cases) of different actions (test steps) against expected behaviors of the software system (expected results).

In some examples, test preparation includes the preparation of specific data to be consumed by test cases. The test data can include a subset of production data, and/or migration data, and/or can include testing data (e.g., generated by the user). Test data preparation (e.g., when performed during or after the build phase) can be complex as it requires deep understanding of the configuration and rules across modules of the software system that will be applied on the data. As a result, application testers need to have a complete understanding of the software system to create ad hoc data for testing. Further, test preparation activities are time consuming and difficult to compress without compromising the quality of the software system that is to be deployed in production.

In view of the foregoing, and as described in further detail herein, implementations of the present disclosure provide a DDT platform that includes the following characteristics: shift left automation (e.g., earlier stage testing), continuous testing, data-oriented testing, and reuse of test artefacts across multiple projects. The DDT platform of the present disclosure takes a shift left approach for testing delivered software systems, and provides a testing tool that enables users (e.g., designers) to seamlessly build testing content, while creating configuration documentation. The DDT platform of the present disclosure also enable sharing of the test artefacts to accelerate industrialization of test process. Further, a data model-driven approach is provided, and a data model can be shared across users. Automation of testing is achieved by leveraging APIs of the enterprise providing the software system. In some implementations, continuous testing is provided for delivered components of the software system. The DDT platform can be described as a customer, and project specific platform for design of testing artefacts. The DDT platform can be instantiated once per project in a secure fashion, and hosted either on the project, or in a cloud-based infrastructure.

At the outset of integration of the software system to a customer, the DDT platform is provisioned for the customer (e.g., at the beginning of the project). In some examples, usage will be initiated in the DDT platform, and test content is created by users (e.g., designers). Users can use the DDT platform to prepare and execute sets of tests in iterative, and share mode, and can create test data for each activity. In some examples, for each activity set by the user, a test activity is provided through different actions set under a test package, and ad hoc component that is to be used (e.g., manual, automated (auto), robot).

For an auto model, a data template can be created (e.g., using MS Excel) to prepare relevant data sets. One or more data objects (e.g., Client, Material, Sales Order) are created under the test package. In some examples, the user is able to link multiple test packages, and execute the test packages against a test environment. Results of the testing are displayed in one or more user interfaces (UIs) of the DDT platform. In some examples, multiple users are able to use the same scenario, and collaboratively enrich the scenario. In some examples, results of scenarios executed against a test instance are reviewed to identify any variance in the overall configuration. In some implementations, users are able to access the detail of test activity to understand the typology, and the nature of the test data. For a manual model, users are able to prepare, and execute test cases on scenarios, and update the result on the DDT platform.

In some implementations, at the end of the project, the DDT platform is decommissioned for the particular customer. A feedback loop is provided using test metrics, and test metadata is harvested (e.g., minus customer and/or project confidential information), and stored in a central repository. In some examples, the metrics and metadata can be used to calibrate future test preparation and execution, and enable the DDT platform to provide recommendations.

In some implementations, and as described in further detail herein, components of the DDT platform include a secure project database, a test design application, a test engine, a scheduler console, a project administrative console, and a delivery viewer. In some examples, the secure project database stores test artefact information, metrics, and other project-related test artefacts. In some examples, the test design application is used by the users to perform test activities. In some examples, the test engine manages the enterprise APIs. In some examples, the scheduler console executes of automated test tasks. In some examples, the project administrative console is used to provision access and to manage referential data for operation of the DDT platform. In some examples, the delivery viewer enables the customer to view the progress of, and validate designs.

In some implementations, the DDT platform includes a central asset repository (CAR) that stores test artefacts. In some examples, the CAR is aligned with the central repository of the sanitised assets. In some examples, the CAR stores design variations, instantiations of test artefacts (e.g., test activity, packages, scenarios for each process by various dimensions (such as industry, function, locale)), and is searchable. The CAR is searchable by internal personnel who can use it to find reusable designs on their project.

In accordance with implementations of the present disclosure, the CAR supports multiple use cases. Example use cases include, without limitation, project preparation workflow, asset ingestion workflow, and asset sharing and propagation. In some examples, the project preparation workflow includes the selection of existing assets that correspond to the scope of work to be delivered at a customer. In some examples, the asset ingestion workflow includes the ingestion of assets from a completed project (compared to the existing baseline, generation of a difference, and merge), the approval of the new assets by asset custodians, and publishing the assets for internal users. In some examples, asset sharing and propagation includes sharing of assets between users for reuse in other projects, and discovery of assets through a search mechanism.

In some implementations, the test artefact design application is used by project consultants to build and execute test artefacts that are used to verify consistency of the design and configuration of a delivered software system. In some examples, object data is created for each designed activity, processes, and scenarios. In some implementations, the project manager application is used by project consultants and project managers to manage tasks and issues, perform reporting on the project's progress, manage project wide scope configuration (such as defining a release), and configuring the status and workflow to the project's requirements. In some implementations, the project administrator application supports the DDT platform in the project's lifecycle by ingesting the initial asset base, exporting assets at the end of the project, managing user access, and performing backups/restores of the database.

In accordance with implementations of the present disclosure, a unified data model (UDM) is provided. More particularly, test artefacts are stored in CAR and project database in the UDM. Changes made to a test artefact are reflected in all other test artefacts, and all elements can be versioned. The UDM is flexible to enable future changes to the delivery approach, and extensions to accommodate different types of software systems.

Figure 2:
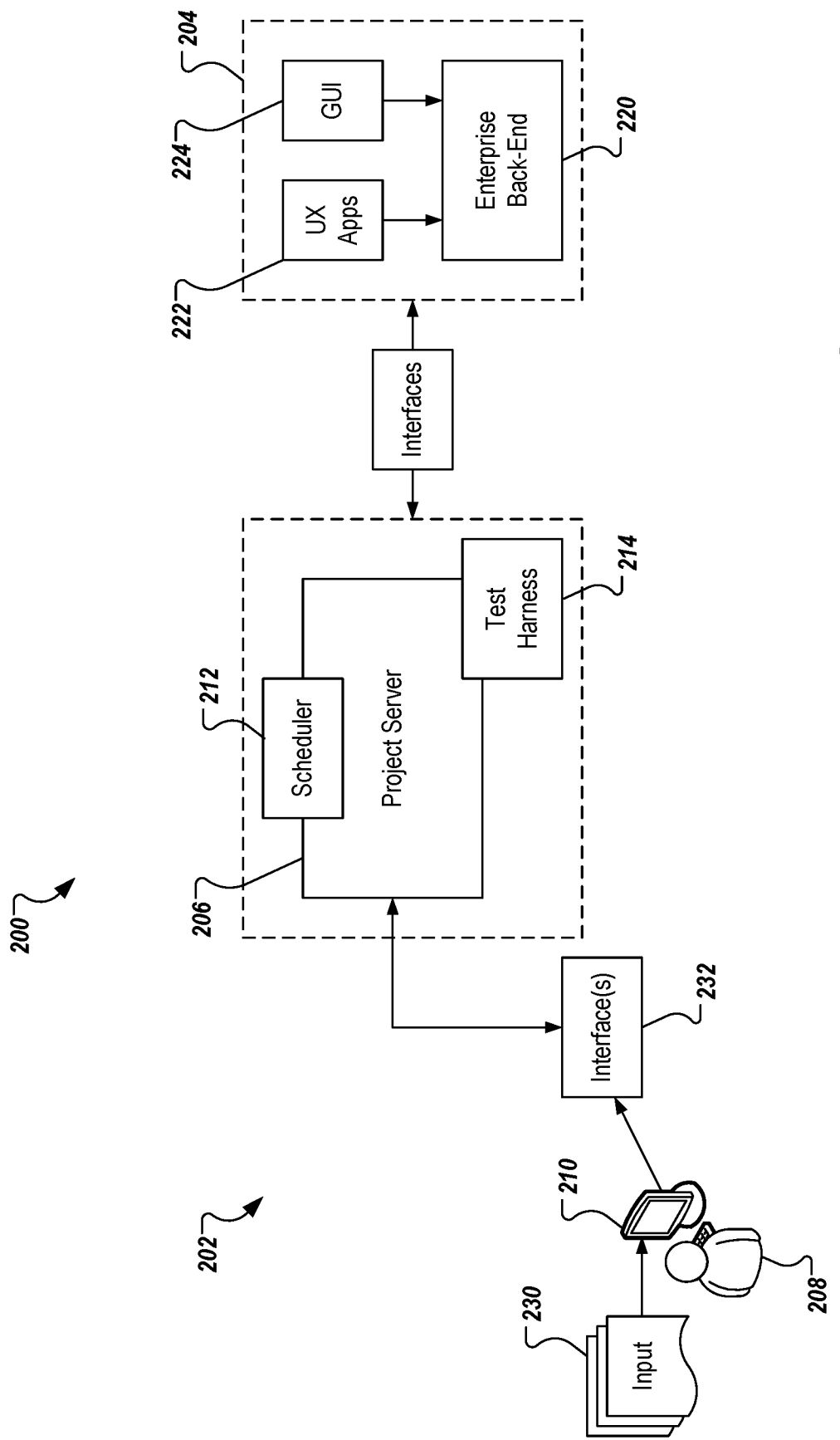
FIG. 2 depicts an example conceptual architecture in accordance with implementations of the present disclosure.

FIG. 2 depicts an example conceptual architecture 200 in accordance with implementations of the present disclosure. The example conceptual architecture 200 includes a DDT platform 202 that interacts with a back-end system 204 to deliver a software system to a customer. In some examples, the back-end system 204 hosts a software system that is to be delivered to a customer. In the example of FIG. 2, the DDT platform 202 includes a project server 206 that a user 208 (e.g., consultant) interacts with using a computing device 210. The project server 206 includes a scheduler 212, and a test harness 214. In the depicted example, the back-end system 204 includes an enterprise back-end 220, one or more user experience (UX) applications 222, and one or more GUIs 224.

In some implementations, the user 208 (e.g., a consultant delivering the software system of an enterprise to a customer) constructs one or more test cases 230 based on test data. In some examples, the test case is provided as a computer-readable file (e.g., MS Excel file). In some examples, the test case is linked to an API of the enterprise (e.g., a business API (BAPI) provided by SAP SE) using the DDT application. In some examples, a mapping between enterprise-side activities, and the API are stored in the DDT database. The user links the API under functional test scenario as the configuration is set in back-end system 204. In some examples, the linking is achieved using variables and constant binding. One or more test scenario interfaces 232 are provided, through which the user can perform the linking.

In some implementations, execution of one or more scenarios are scheduled. For example, the scheduler 212 schedules running of the scenarios. In some examples, a scenario can be scheduled to run ad-hoc, or daily. The test harness 214 executes request services (e.g., API+JSON). The test cases, and scenarios are run on the back-end system 204, and test results are provided as output. More particularly, the test harness 214 receives test results (e.g., data, log files) from the back-end system 204. In some examples, expected results (e.g., provided in JSON) are compared to the actual results (e.g., provided in JSON), and a comparison output is provided. In some examples, the comparison output is displayed in the interface 232 (e.g., as MS Excel sheet(s)).

Figure 3:
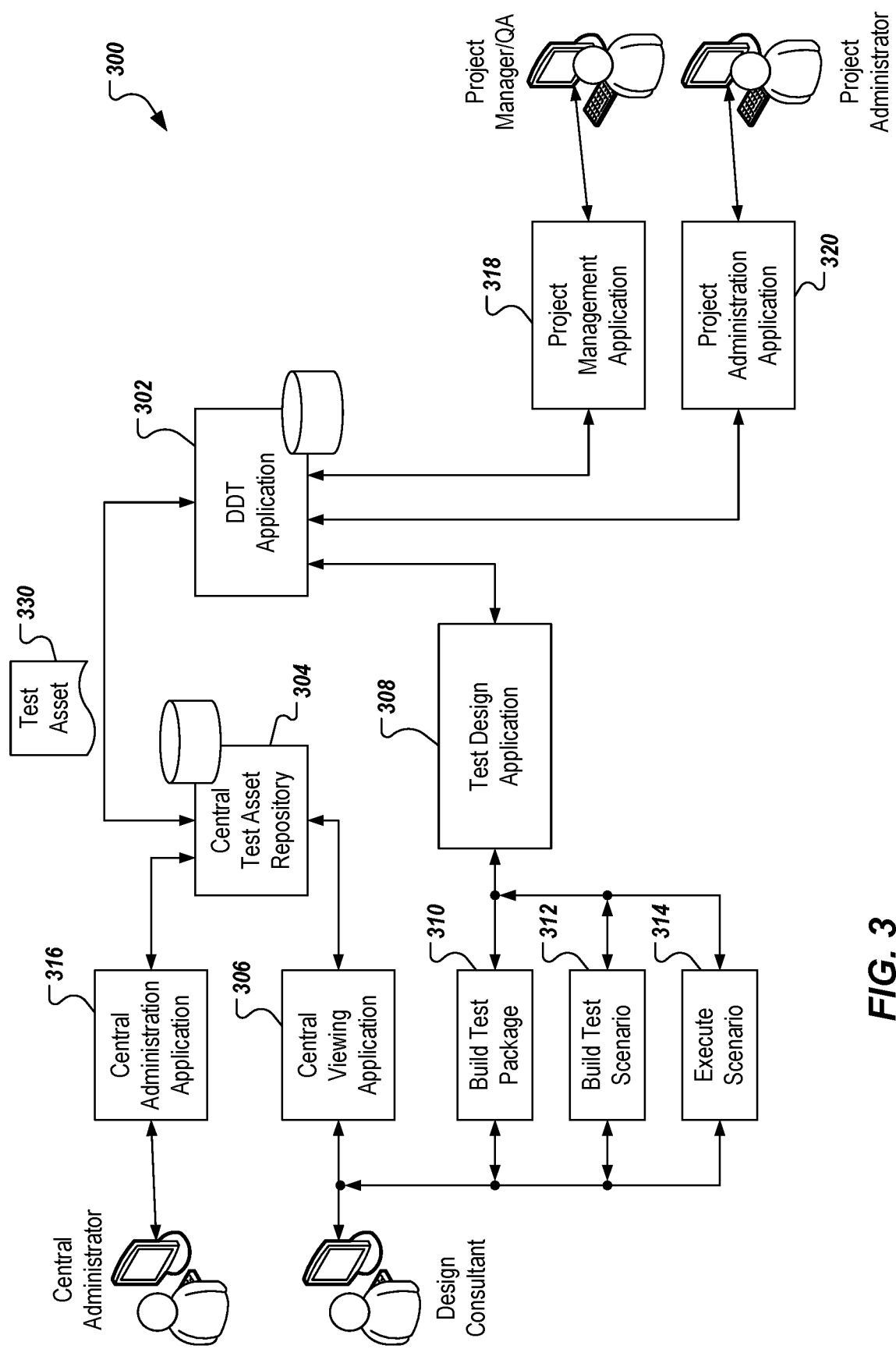
FIG. 3 depicts an example module architecture in accordance with implementations of the present disclosure.

FIG. 3 depicts an example module architecture 300 in accordance with implementations of the present disclosure. The example module architecture 300 includes a DDT application 302, a central test asset repository 304, a central viewing application 306, a test design application 308, a build test package module 310, a build test scenario module 312, an execute scenario module 314, a central administration application 316, a project management application 318, and a project administration application 320. In some examples, the DDT application 302 includes a project database, and the central test asset repository 304 includes a central database. In some implementations, and as described in further detail herein, the DDT application 302 executes test packages, and test scenarios in software systems that are delivered to customers.

In some implementations, a user (e.g., design consultant) interacts with the central viewing application 306, and the test design application 308 to build, and execute test packages, and test scenarios using the DDT platform of the present disclosure. In some examples, the user interacts with the build test package module 310, the build test scenario module 312, the execute scenario module 314 to build, and execute test packages and test scenarios through the test design application 308.

In some implementations, a user (e.g., central administrator) interacts with the DDT platform through the central administration application 316. In some implementations, a user (e.g., project manager, quality assurance (QA)) interacts with the DDT platform through the project management application 318. In some implementations, a user (e.g., project administrator) interacts with the DDT platform through the project administration application 318.

In accordance with implementations of the present disclosure, the test design application 308 enables users to design the component(s) that will be used for the test of an activity. Example UIs include, without limitation, a test activity definition interface, and a test package definition interface. In some examples, the test activity definition interface enables users to define test activities aligned with an activity description. In some examples, the test activity definition interface enables users to select the nature, and the type of test artefacts (work package) to be used to make a proper coverage of the test of an activity. In some examples, the test package definition interface enables users to prepare and load a number of data structured under test cases from an external document (e.g., MS Excel spreadsheet).

In some implementations, and with regard to creating test content, the user opens a web browser to access the DDT platform (e.g., the test design application 308). The user can provide a description of the test activity, and create a test package that corresponds to test cases to cover and that are related to the configuration of the software system that is being tested. In some examples, test cases can include error test cases (e.g., purposefully triggering errors) to test fault messages. In some examples, a test activity interface is displayed, and receives user input for the described activities. For example, the test activity interface depicts the description of a test activity. In some examples, the user can select the type of test (e.g., test package) that is to be executed through the test activity interface. The user can select a type of action (e.g., AUTO, ROBOT, MANUAL).

In some implementations, the AUTO option can be selected to execute the test cases through an API of the enterprise providing the software system. An API that corresponds to the activity can be selected. In some examples, if there is not an existing API that can be used for the activity, an API can be created in the format of the transaction as well as the JSON call to call the API. In some examples, a name of the API corresponds to the activity to easily discern between APIs in a list (e.g., a drop down list). In general, all of the APIs are connected to respective activities in the data model.

In some implementations, the user uses a spreadsheet (e.g., MS Excel), or a template, to create test cases. In some examples, multiple test cases are provided, and bundled together in a test package. In some examples, multiple test packages can be provided. Using a spreadsheet as an example, fields that are to be variable can be identified. The test package file can be saved, and subsequently modified, if needed. In some examples, the test package is automatically created upon saving of the file.

In some implementations, the build test scenario module 312 (also referred to as a test scenario application) enables users to build scenarios that will be used for the test of an activity. Example interfaces include, without limitation a test scenario hierarchy browser, a test scenario definition interface, and a test scenario step definition interface. In some examples, the test scenario hierarchy browser enables users to manipulate (e.g., edit) test scenarios that have been created under a hierarchy (e.g., a business hierarchy). In some examples, users can edit, view, create, and/or delete scenarios from the current repository (e.g., the central test asset repository 304). In some examples, the test scenario definition interface enables users to manipulate (e.g., edit) elements of test scenarios in a collaborative way. For example, users can build common variables that will be used during all test scenarios, select different test steps that will be executed under a test scenario, and/or define a session and an environment, within which the scenario will be executed. In some examples, the test scenario step definition interface enables users to manipulate (e.g., edit) contextual elements that will be used for each scenario step. For examples, users can assign variables to dynamic test data (e.g., data created from a previous test step), assign constants to variables for the test scenario step, and/or manage the expected Result from the output file.

With regard to creating test scenarios, a test scenario directory can be selected from the web browser (e.g., through which the user interacts with the build test scenario application) of the DDT platform. In some examples, the test scenario directory displays multiple test scenarios (e.g., organized by hierarchical business structure). The user can edit, copy, view, delete, and/or create scenarios. In some examples, to create an initial scenario from the object browser, a position within the hierarchy where the scenario is to be created is selected, and a create option is selected to begin creation. In some examples, creation of a test scenario includes entering a description of the test scenario, providing attachments, and creating constants. In some implementations, a test scenario can be auto or manual, auto and robot, or full robot. In some examples, if external data is needed in the test scenario, it can be requested from other users. In some examples, the other users can access the test package to add steps, and/or to create specific data in the test package. In some examples, the test package in an activity can be viewed to see the test cases without changing them. If the cases proposed in a test package are not suitable, an update can be requested, another test package can be created, or the test package can be modified. In some implementations, one or more values can be bound to define expected results.

In some implementations, and with respect to creating an auto test scenario, a first step of a scenario can be manually entered. In some examples, in advance, it can be determined whether there are test packages, with an auto type in the test package attached to an activity that includes data that can be used in the test activity. In some examples, a UI element (e.g., +button) can be selected to create a test scenario step. An activity and a test package can be selected. In response, test names and test cases can be displayed. In some examples, a UI element (e.g., >icon) can be selected to validate the creation of the steps. The test scenario is created, and can be edited. In some examples, editing of the test scenario can include creating directories in the test scenario, which provides a list of steps in the test scenario. In some examples, the directory is visible in the test scenario browser. However, to move/delete a scenario step, the step can be selected, and any constraints of any previous steps, and/or subsequent steps are noted (e.g., visually highlighted by color, or any appropriate graphical treatment). In this manner, inconsistencies cab be avoided.

In some implementations, during editing of a test scenario, a step can be executed with environment variables from the edit scenario menu, and an output is provided. In some examples, the variables that were provided from the input file are displayed. In some examples, the variable output area is initially grayed out as well as the view output, edit expected result, and save expected result interface elements. If a constant is to be assigned to a variable, the constant can be selected from a list, including the name of the constant in the list of constants proposed for the scenario. If a value from another test package is to be selected, a chain interface element can be selected, which displays a menu, from which available variables, or variables by test step, test case, and variable name can be selected. In some implementations, to create an output variable, a name for a reference of a table of the output file, the column, and, in some cases, a specific filter on data are provided. After all variables are created and bound, the changes are saved. The test scenario can again be displayed, and depicts the input file, the output file, and the comparison file. In some examples, if the output file is relevant, it can be saved as an expected result file.

In some implementations, and with regard to an auto scenario step, an auto scenario step can be executed from a test scenario design UI. In this manner, the parameters and values that are passed can be viewed for correctness. In some examples, execution of the auto scenario step will send a request to the scheduler with all of the information to run the harness test in the scheduler. The return of the execution values will be transmitted back and displayed on the scenario step line with a message (e.g., success, connection error, error API). In some examples, at runtime, selection of a session name will be requested as well as environment/client parameters to execute the request. Running the session is visible in a load/consult session UI.

In some implementations, when the scheduler finishes its session, the return code of the harness test will be visible (e.g., in the form of an icon of success or failure). In some examples, the return code (e.g., icon) can be selected (or hovered over) to display the error or success message. In some examples, the step can be edited, and the output file displayed. The output file can be saved as the expected result.

In some implementations, and with regard to running an auto test scenario, a complete scenario can be executed (e.g., selecting a run all option). In this case, all of the scenario steps and their context (e.g., constant, variable in, variable out, file in, expected result) are sent to the scheduler for execution to the harness test. If an existing session has not been selected, an input field for a session name as well as an input field for the environment, and the execution client are displayed. With this information the scheduler can execute the session. When the scheduler finishes the session, the return code of the harness test will be visible (e.g., in the form of an icon of success or failure). Putting the mouse pointer on it must be able to read the error or success message. In some examples, the return code (e.g., icon) can be selected (or hovered over) to display the error or success message. In some examples, the step can be edited, and the output file displayed. The output file can be saved as the expected result.

In some implementations, a session can be selected (e.g., by selecting a session load icon) by session name, execution date, user name in which the result of execution return will be displayed. In some examples, the current session can be selected.

In some implementations, automatic test can be run on a periodic basis (e.g., daily). In some examples, this is directly executed by the scheduler. In some examples, the tasks and the constraints of execution of the scenarios (before, after) will be shared with the operator in charge of the preparation of the scheduling. Scenarios will be run systematically based on a new session (which contains the entire context of the scenario). Each scenario step will make the call to the test harness for API processing. In some examples, the result of the scenario execution can be provided through a search for a session (E.g., "Session <date>", a date of execution, the user of the operator).

In some implementations, the project administration application 320 is used by users who are responsible for maintaining the client instance of the DTD application 302. In some examples, the project administration application 320 supports the lifecycle of the DDT platform at a client project at start up, during design, and at project close. In some examples, at project start up, a set of test artefacts (e.g., test scenarios, test package, input file, output file) are imported into the DDT project instance. During the project, additional assets from the central repository can be added into the DDT platform, if required. In some examples, at the end of the project, assets can be exported to be processed for harvesting. During the project run, a live stream of project events associated with the tasks, and issues being completed on the project are sent to the central server (e.g., in real-time, or near real-time. In this manner, assets that might be reusable can be identified.

In some implementations, backup and restore functionalities are provided. In some examples, the backup and restore functionalities save the current state of the DDT platform in the case where the instance is corrupted due to a hardware failure, or incorrect manipulation by a user. In some implementations, functionality for managing users, user groups, and security is provided. In some examples, access to the instance is defined by a project administrator, who defines the users, groups, and access rights to the DDT platform.

In some implementations, the project management application 318 enables users to manage tasks and issues during test activities. In some examples, task management functionality enables each user to have a list of tasks corresponding to the design tasks that they need to complete in the DDT platform. As users complete each design task, they can update the status or position of the task in a workflow to keep the management team up to date. Issue management functionality enables each user to have an issue management tool to document project issues raised during design. Users can use the tool to update, and eventually close issues as they are resolved. Reporting functionality provides a set of project reports that will provide information on the outstanding issues, tasks remaining, effort, and a dashboard on the current health of the project.

In some implementations, the central viewing application 306 enables users to search for assets within the central test asset repository 304, and to follow specific topics of interest on projects. In some examples, users can search for reference implementations or variants of implementations in the central test asset repository 304 for their use. In some examples, users can subscribe to topics of interest (e.g., industry, functional area). In this manner, as projects progress, users can be informed (e.g., in real-time) of relevant work that has been recently developed. In some examples, to subscribe to Topics, users can interact with the central viewing application 306 to choose the types of notifications that they wish to subscribe to. As projects are completed, the notifications are published to the central server where they are automatically added to the user's topic stream. In some examples, the topic stream is automatically generated for the user based on their topic subscriptions as well as other pertinent data. The topic stream can be provided as a stream of events from active projects all around the world as they complete various tasks and issues that may be pertinent to the user.

In some implementations, users can search for assets. In some examples, users can access a search screen to discover assets that are in the central test asset repository 304. In some examples, the search screen includes text search functionality that can be used to search for pertinent assets, and view a hierarchical view of the data. In some implementations, search and user analytics can be generated to report on the topics that are being subscribed to, the text of the searches, as well as assets that are in high demand, for example.

In some implementations, the central administration application 316 enables users (e.g., central administrators) to control the central viewing application 306. In some examples, the central administration application 316 enables users to implement project assets, export a test start packs for new projects, and conduct central management reporting. With regard to implement project assets, the central administration application 316 enables ingestion of project test asset exports with a specific workflow. In some examples, this functionality performs a differential merge with the existing central repository to determine which imported test assets have changed, and what kind of variations there are as compared to the central test asset repository 304. In this manner, the users can, for example, validate either a merge to an existing test asset or the creation of a new variant.

In some implementations, when a new project starts, the central administration application 316 can be used to select test assets that match the scope of the project. Further, test assets can be exported for ingestion to the project instance of the DDT platform. In some implementations, as projects are run, there will be a project performance feedback (e.g., in real-time) during project execution that will be centrally stored and reported. Information on effort (on tasks and issues), and project progress can be reported on and compared cross geographic units and projects.

Figure 4:
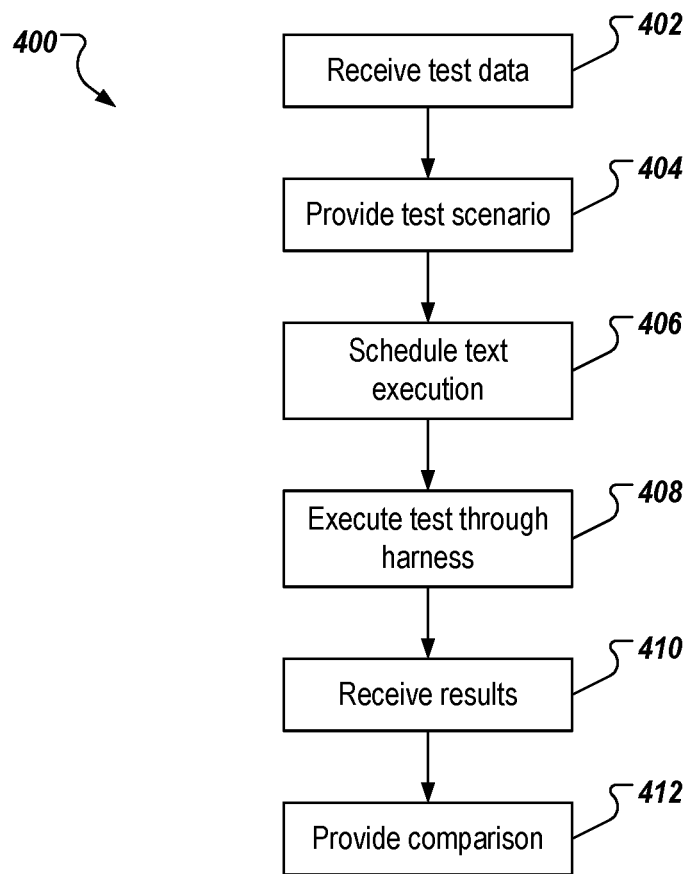
FIG. 4 depicts an example process that can be executed in implementations of the present disclosure.

FIG. 4 depicts an example process 400 that can be executed in implementations of the present disclosure. In some examples, the example process 400 is provided using one or more computer-executable programs executed by one or more computing devices (e.g., the back-end system 108 of FIG. 1).

Test data is received (402). For example, and as described above with reference to FIGS. 2 and 3, a user (e.g., a consultant delivering the software system of an enterprise to a customer) constructs one or more test cases based on test data. In some examples, the test case is provided as a computer-readable file (e.g., MS Excel file) that includes the test data. In some examples, the test data includes data that is used to create, and/or modify data objects within a database of the software system under test during test execution. A test scenario is provided (404). For example, and as described herein, a test scenario includes multiple test elements (e.g., activities) that are executed through APIs. In some examples, an activity includes a set of transactions that are to be executed on data objects within a database. Example transactions can include, without limitation, creating, modifying, and/or deleting data, and/or data objects within the database. As described herein, with reference to FIG. 3, the test scenario can be provided through the build test scenario module of the DDT platform, which enables users to build scenarios that will be used for the test of an activity. When executed, test scenarios directly impact data objects within a database to observe whether the integration executes properly (e.g., were the data objects properly updated within the database).

Execution of the test is scheduled (406). For example, and as described herein, a schedule of the DDT platform schedules execution of the test scenario. In some examples, the scheduler schedules execution of the test scenario to execute at a particular time (e.g., overnight). In some examples, multiple test scenarios may be run, and the scheduler schedules execution to avoid any conflicts. The test is executed through a harness (408). For example, and as described herein, the harness takes data from test files, converts the data to an appropriate format (e.g., JSON), and sends the data to and to the software system under test through one or more APIs.

Results of the test are received (410). For example, and as described herein, the harness receives an output file from the software system under test. In some examples, the test results (e.g., data, log files) are provided as actual results (e.g., changes to data objects within the database) occurring in the back-end system. A comparison is provided (412). For example, the harness provides the comparison based on expected results, and the actual results received. In some examples, expected results (e.g., provided in JSON) are compared to the actual results (e.g., provided in JSON), and a comparison output is provided. In some examples, the comparison output is displayed in an interface (e.g., as MS Excel sheet(s)).

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method executed by one or more processors for testing of delivered software systems, the method comprising:
   receiving, by a data drive test (DDT) platform executing on a first server system, one or more computer-readable files comprising test data, the test data comprising data that is specific to a first customer in a set of customers to execute at least one transaction during testing of a software system that is configurable for each customer in the set of customers and at least partially hosted by a vendor back-end system executing on a second server system;
   providing, by the DDT platform, one or more test scenarios for execution by the software system on the vendor back-end system, the one or more test scenarios comprising a set of activities to conduct transactions by the software system using at least a portion of the test data, the one or more test scenarios being specific to the first customer;
   scheduling, by a scheduler of the DDT platform, execution of the one or more test scenarios using a test harness of the DDT platform, the one or more test scenarios being executed by the software system as configured for the first customer, the scheduler communicating with the test harness to trigger execution of the one or more test scenarios, the test harness providing activity-specific calls to the second server system for execution of each activity in the set of activities for a respective test scenario by the software system;
   receiving, by the test harness of the DDT platform, test results from the vendor back-end system; and
   comparing, by the test harness the DDT platform, the test results to expected results to provide a comparison as output.

2. The method of claim 1, wherein execution of the one or more test scenarios at least partially comprises, by the test harness:
   converting at least a portion of the test data from a first format to a second format; and
   transmitting at least a portion of converted test data to the software system through one or more application programming interfaces (APIs).

3. The method of claim 2, the one or more APIs are exposed by the vendor back-end system.

4. The method of claim 1, wherein the test harness receives the test results, and compares the test results to the expected results, and provides the comparison.

5. The method of claim 1, wherein the one or more test scenarios are provided based on user input to a test design application of the DDT platform.

6. The method of claim 5, wherein at least one test scenario is partially based on reuse of a test asset stored in a central repository of the DDT platform.

7. The method of claim 1, wherein execution of the one or more test scenarios affects one or more data objects stored within a database of the vendor back-end system.

8. The method of claim 7, wherein at least a portion of the test results comprises changes to the one or more data objects, and at least a portion of the expected test results comprises expected changes to the one or more data objects.

9. A non-transitory computer-readable storage medium coupled to one or more processors and having instructions stored thereon which, when executed by the one or more processors, cause the one or more processors to perform operations for testing of delivered software systems, the operations comprising:
   receiving, by a data drive test (DDT) platform executing on a first server system, one or more computer-readable files comprising test data, the test data comprising data that is specific to a first customer in a set of customers to execute at least one transaction during testing of a software system that is configurable for each customer in the set of customers and at least partially hosted by a vendor back-end system executing on a second server system;
   providing, by the DDT platform, one or more test scenarios for execution by the software system on the vendor back-end system, the one or more test scenarios comprising a set of activities to conduct transactions by the software system using at least a portion of the test data the one or more test scenarios being specific to the first customer;
   scheduling, by a scheduler of the DDT platform, execution of the one or more test scenarios using a test harness of the DDT platform, the one or more test scenarios being executed by the software system as configured for the first customer, the scheduler communicating with the test harness to trigger execution of the one or more test scenarios, the test harness providing activity-specific calls to the second server system for execution of each activity in the set of activities for a respective test scenario by the software system;
   receiving, by the test harness of the DDT platform, test results from the vendor back-end system; and
   comparing, by the test harness the DDT platform, the test results to expected results to provide a comparison as output.

10. The computer-readable storage medium of claim 9, wherein execution of the one or more test scenarios at least partially comprises, by the test harness:

converting at least a portion of the test data from a first format to a second format; and transmitting at least a portion of converted test data to the software system through one or more application programming interfaces (APIs).

11. The computer-readable storage medium of claim 10, the one or more APIs are exposed by the vendor back-end system.

12. The computer-readable storage medium of claim 9, wherein the test harness receives the test results, and compares the test results to the expected results, and provides the comparison.

13. The computer-readable storage medium of claim 9, wherein the one or more test scenarios are provided based on user input to a test design application of the DDT platform.

14. The computer-readable storage medium of claim 13, wherein at least one test scenario is partially based on reuse of a test asset stored in a central repository of the DDT platform.

15. The computer-readable storage medium of claim 9, wherein execution of the one or more test scenarios affects one or more data objects stored within a database of the vendor back-end system.

16. The computer-readable storage medium of claim 15, wherein at least a portion of the test results comprises changes to the one or more data objects, and at least a portion of the expected test results comprises expected changes to the one or more data objects.

17. A system, comprising:
one or more processors; and
a computer-readable storage device coupled to the one or more processors and having instructions stored thereon which, when executed by the one or more processors, cause the one or more processors to perform operations for testing of delivered software systems, the operations comprising:
receiving, by a data drive test (DDT) platform executing on a first server system, one or more computer-readable files comprising test data, the test data comprising data that is specific to a first customer in a set of customers to execute at least one transaction during testing of a software system that is configurable for each customer in the set of customers and at least partially hosted by a vendor back-end system executing on a second server system;
providing, by the DDT platform, one or more test scenarios for execution by the software system on the vendor back-end system, the one or more test scenarios comprising a set of activities to conduct transactions by the software system using at least a portion of the test data, the one or more test scenarios being specific to the first customer;
scheduling, by a scheduler of the DDT platform, execution of the one or more test scenarios using a test harness of the DDT platform, the one or more test scenarios being executed by the software system as configured for the first customer, the scheduler communicating with the test harness to trigger execution of the one or more test scenarios, the test harness providing activity-specific calls to the second server system for execution of each activity in the set of activities for a respective test scenario by the software system;
receiving, by the test harness of the DDT platform, test results from the vendor back-end system; and
comparing, by the test harness the DDT platform, the test results to expected results to provide a comparison as output.

18. The system of claim 17, wherein execution of the one or more test scenarios at least partially comprises, by the test harness:
converting at least a portion of the test data from a first format to a second format; and
transmitting at least a portion of converted test data to the software system through one or more application programming interfaces (APIs).

19. The system of claim 18, the one or more APIs are exposed by the vendor back-end system.

20. The system of claim 17, wherein the test harness receives the test results, and compares the test results to the expected results, and provides the comparison.

21. The system of claim 17, wherein the one or more test scenarios are provided based on user input to a test design application of the DDT platform.

22. The system of claim 21, wherein at least one test scenario is partially based on reuse of a test asset stored in a central repository of the DDT platform.

23. The system of claim 17, wherein execution of the one or more test scenarios affects one or more data objects stored within a database of the vendor back-end system.

24. The system of claim 23, wherein at least a portion of the test results comprises changes to the one or more data objects, and at least a portion of the expected test results comprises expected changes to the one or more data objects.

* * * * *